Aug. 10, 1954  J. M. HOAGUE ET AL  2,686,249
IMMERSION TYPE HOT WATER HEATER
Filed Dec. 26, 1951

INVENTORS
JAMES M. HOAGUE
FLOY B. HOAGUE

BY *Morring Wright*

ATTORNEYS

Patented Aug. 10, 1954

2,686,249

UNITED STATES PATENT OFFICE 2,686,249

IMMERSION TYPE HOT WATER HEATER

James M. Hoague and Floy B. Hoague, Janesville, Wis.; said Floy B. Hoague assignor to said James M. Hoague Application December 26, 1951, Serial No. 263,249

1 Claim. (Cl. 219—38)

Our invention appertains to hot water heaters, and more particularly to hot water heaters of the immersion type adapted to heat and furnish hot water for domestic purposes.

Heretofore, it has been extremely difficult in heating water in domestic hot water tanks, to quickly and efficiently raise the water to the desired temperature, to avoid the depositing of lime on the heating elements or along the walls of the tank, and to maintain a uniform temperature throughout the entire tank. This is due primarily to the fact that present types of domestic hot water tanks are ordinarily heated from the outside, either by applying heat to the bottom of the tank or through the outer walls.

Various attempts have been made to overcome the above difficulties by providing heating elements, usually in the form of heating coils and submerging the same directly in the water to be heated, but these efforts have proved unsatisfactory in that no thought has been given to the idea of providing a controlled pre-determined and rapid path of local circulation in the tank so that all the water in the tank may be quickly and efficiently heated to the desired uniform temperature. Almost invariably in present day hot water heaters the water around the heater is either heated to such a high temperature that the lime is caused to separate from the water forming unnecessary lime deposits on the heating elements and walls of the tank, or a great amount of time is required to raise the water to the necessary temperature required for domestic use.

Therefore, a primary object of our invention is to provide a hot water tank in which the heating elements are positioned in the lower portion of the tank and submerged in the liquid to be heated, in such a manner as to produce a rapid local circulation within the tank and a rolling, scrubbing effect through the heater.

Another object of our invention is to provide a series of narrow encased electric heaters having a relatively large vertical surface and including means for dividing the water to be heated into thin sheets, whereby the friction of the rising heated water against the side walls of the vertical heaters will result in a scrubbing action that makes the transferring of heat from the heating element to the water very rapid and will also effectively scour the side walls of the heater to keep it free from scale and similar deposits.

A further object of our invention is to provide a bracket plate in the tank extending transversely across the rear portion of the tank, which not only aids in supporting the inner portions of the narrow encased heaters but also forms a fourth side of the conduits or pipes through which the heated water flows from the bottom of the tank toward the top thereof.

Another important object of the above invention is to provide an immersed heater which will quickly and efficiently heat all of the water in the tank in such a manner that the temperature of the water in direct contact with the side walls of the heaters can be controlled to a fine degree to not exceed the point where heating causes the lime in water to separate.

A still further object of our invention is to provide a water heater for domestic hot water tanks which is simple in construction, reliable in its operation and not liable to get out of order. With these and other objects in view, and to the end of attaining any other advantage hereinafter appearing, this invention consists in certain features of construction and combination and arrangement of parts, hereinafter described, pointed out in the claim and illustrated in the accompanying drawings.

A preferred and practical embodiment of the invention is shown in the accompanying drawings in which.

Referring now to the drawings in detail wherein similar reference characters designate corresponding parts throughout the several views, the letter H generally indicates one type of our improved hot water heater, and the same is shown associated with a domestic hot water tank T.

Figure 1:
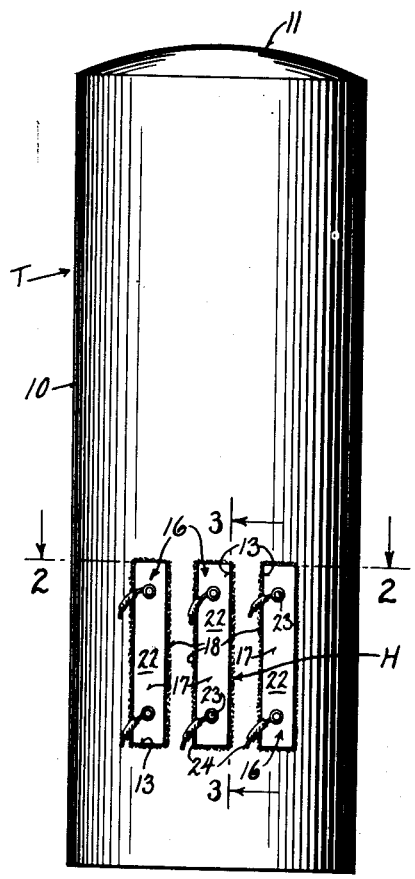
Figure 1 is a front elevational view in perspective of a hot water tank embodying the heating elements constructed in accordance with our present invention.
Figure 2:
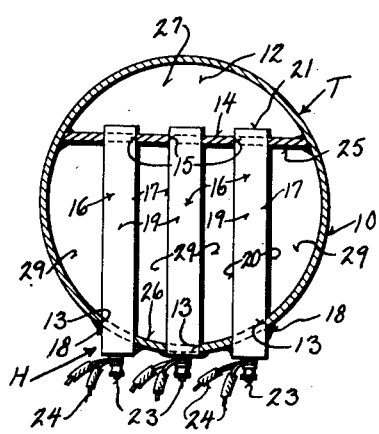
Figure 2 is a top plan view of the heating elements, a section being taken through the tank on the line 2—2 of Figure 1, looking in the direction of the arrows, and clearly showing the transversely positioned bracket plate for supporting the rear of the narrow encased heating elements.

The tank T can be of any standard construction and includes the upright cylindrical wall 10, top 11 and bottom 12. While not shown, water is adapted to enter the tank adjacent the bottom thereof and may be drawn off at any point adjacent the top thereof, and in accordance with the present invention the front portion of the wall 10 is provided with any desired number of vertically extending rectangularly shaped slots 13. Welded inside of the tank T in rear of the slots 13 and extending transversely across the tank is a bracket plate 14. This bracket plate 14 is also provided with a number of vertically extending rectangularly shaped slots 15 which are in alignment with the slots 13 formed in the front portion of the cylindrical wall 10 of the tank T.

Figure 3:
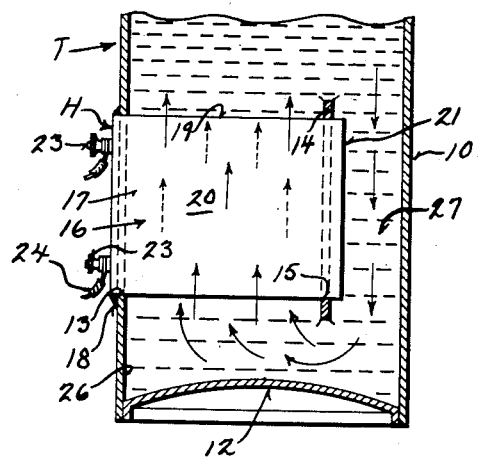
Figure 3 is a side elevational view in section through the tank, the section taken on the line 3—3 of Figure 1, looking in the direction of the arrows, and illustrating the controlled path of water circulation in the tank.
Figure 4:
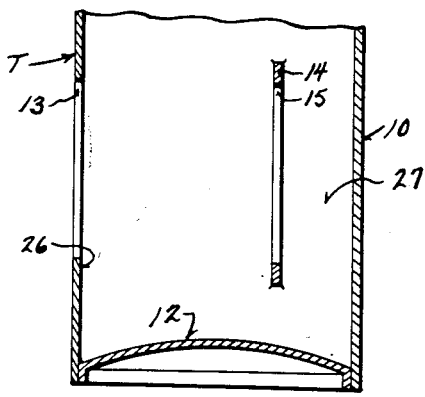
Figure 4 is a fragmentary side elevational view similar to Figure 3 of the drawings but with the heating units removed from the tank.

Encased narrow electric heaters 16 are inserted into the slots 13 and 15 and the side and top edges of the casings 17 of the heaters 16 are secured to the edges of the slots 13 by welding thereto as indicated by the reference numeral 18. Each heating element 16 is formed with a narrow outer casing 17 which is elongated in the vertical direction and includes top and bottom walls 19, side walls 20, rear wall 21 and front wall 22. If desired the front wall 22 may be removable so that the heating elements 16 may be easily removed from their casings 17. In any event, the front plate 22 is provided with suitable electric terminals 23 to which are attached wires 24 leading to a suitable source of electrical energy. It is to be particularly noted that when the heating elements 16 are secured in their proper position adjacent the lower portion of the tank T, that the front wall 25 of the bracket plate 14 forms with the side walls 20 of the heating units 16 and the inner surface 26 of the cylindrical wall 10 of the tank, a number of conduits or pipes 29 open at the top and bottom through which the water may circulate as indicated in particular by the arrows in Figure 3 of the drawing.

The side walls 20 of each heating unit provide elongated hot surfaces past which the water will flow, and the conduits 29 serve to divide the water into thin sheets. The cold water flows downwardly in the space 27 in rear of the bracket plate 14 and thence upwardly between the side walls 20 of the heating elements, and this forced circulation results in a rolling scrubbing action set up by friction with the side walls 20 and results in the transfer of heat from the heating elements to the water in a very rapid and efficient manner. This means that all of the water in the tank T is quickly and efficiently raised to an even temperature and by means of an aquastat (not shown) this temperature can be easily controlled so that the water passing through the conduits 29, formed between the heating units and the walls of the bracket plate 14 and tank T, may be held at a point just below the temperature at which the lime in the water would ordinarily separate therefrom.

However, if, for any reason, the temperature should exceed the point where the lime and water will separate, this scrubbing action will thoroughly scour the heating elements and will prevent the formation of scale or lime thereon and will eventually cause the lime that does separate to settle in the bottom of the tank. However, it is to be stressed that under ordinary working conditions there is no separation whatever of the lime from the water during the heating process, as the circulation of the water is extremely rapid and the water is quickly heated to the desired even temperature throughout the entire tank. This action prevents the aforementioned difficulty of overheating the water at any point before the whole tank of water is heated to the desired temperature.

From the foregoing, it is believed that the features and advantages of the invention will be readily apparent to those skilled in the art, and it will, of course, be understood that changes in the form, proportion and minor details of construction may be resorted to without departing from the spirit of the invention or the scope of the appended claim.

We claim:

A fluid heater comprising a cylindrical pressure chamber, a plurality of spaced relatively narrow rectangular shaped identical casings extending into said chamber adjacent the lower end thereof, a heating member in each casing, each casing having a closed inner end terminating short of the rear wall of the chamber, the two side walls of each casing being elongated to provide a large vertical surface, a thin rectangularly shaped bracket plate extending transversely across the chamber adjacent the inner end portions of said casing and having its top and bottom spaced from the top and bottom of the chamber, and means associated with said bracket plate for receiving and supporting the inner ends of the heater casings, including a plurality of vertical upright slots in said plate, each slot being of a size and configuration to snugly receive the inner end of a respective casing, whereby, a relatively large conduit is provided between the forward surface of said bracket and the adjacent chamber portion for the upward movement of the fluid past the heater casings and a relatively smaller conduit is provided between the rear surface of said bracket and the adjacent chamber portion to provide for the downward movement of the fluid.

References Cited in the file of this patent
UNITED STATES PATENTS

| Number | Name | Date |
| --- | --- | --- |
| 907,109 | Faller | Dec. 15, 1908 |
| 1,446,807 | Mercer | Feb. 27, 1923 |
| 1,456,907 | Penton | May 29, 1923 |
| 1,508,130 | Sanger | Sept. 9, 1924 |
| 1,529,200 | Mercer | Mar. 10, 1925 |
| 1,985,831 | Hynes | Dec. 25, 1934 |